United States Patent [19]

Cole

[11] 4,213,127
[45] Jul. 15, 1980

[54] DOUBLY ADAPTIVE CFAR APPARATUS

[75] Inventor: Lanier G. Cole, Crofton, Md.

[73] Assignee: The United States of America as represented by the Secretary of the Air Force, Washington, D.C.

[21] Appl. No.: 8,144

[22] Filed: Jan. 31, 1979

[51] Int. Cl.$^2$ .............................................. G01S 9/02
[52] U.S. Cl. .............................. 343/5 CF; 343/5 VQ
[58] Field of Search ........................... 343/5 CF, 5 VQ

[56] References Cited

U.S. PATENT DOCUMENTS

| 3,701,149 | 10/1972 | Patton et al. | 343/5 CF X |
| 4,013,998 | 3/1977 | Bucciarelli et al. | 343/5 CF X |

OTHER PUBLICATIONS

"Modified Generalized Sign Test Processor for 2-D Radar" by Trunk et al., IEEE Transactions on Aerospace and Electronic Systems, vol. AES-10, No. 5, pp. 574-572, Sep. 1974.
"Radar Track Extraction Systems" by Quigley et al., AGARD Conference Proceedings, No. 197 on New Devices, Techniques and Systems in Radar, The Hague, Netherlands, Jun. 1976, pp. 19-1 thru 19-20.
"Su Un Circuito Anti–Interferenza per Sistemi Radar Realizzato Con Linee Di Ritardo" by Picardi et al., vol. XXXVII-No. 12, Dec. 1968, pp. 1147-1153.

Primary Examiner—Malcolm F. Hubler
Attorney, Agent, or Firm—Joseph E. Rusz; William Stepanishen

[57] ABSTRACT

A doubly adapative constant false alarm rate (CFAR) apparatus utilizing a doubly adaptive detector which is based upon the use of an auxiliary parallel adaptive detector in addition to the conventional main adaptive detector. The auxiliary adaptive detector has a lower threshold setting. The threshold crossing rate of the auxiliary detector, which depends upon the clutter statistics, is used to adjust the base multiplier setting of the main detector.

3 Claims, 1 Drawing Figure

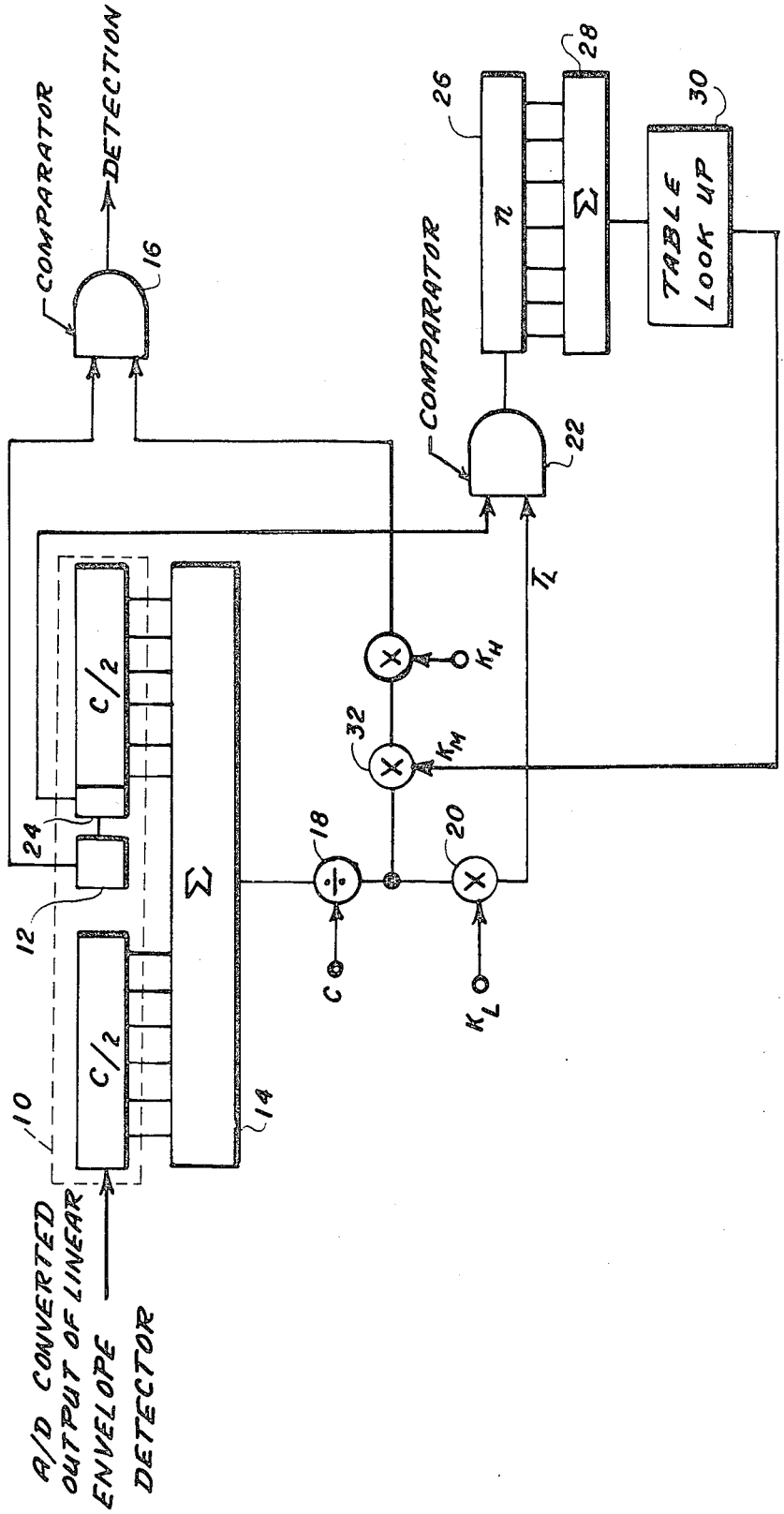

DOUBLY ADAPTIVE CFAR APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to constant false alarm rate detectors and in particular to a doubly adaptive CFAR apparatus.

In the prior art, spatially-varying clutter statistics and dense maritime traffic environments impose difficult requirements on a conventional adaptive detector. This is because the detector fails to maintain a constant false alarm rate as clutter statistics vary and also fails to accommodate target-to-target interference as target enters the CFAR block. There is a further problem for the conventional adaptive detector which fails to accommodate the target-to-target interference as targets pass through the clutter cells in the detector. The clutter cells are usually referred to as a CFAR block which forms the clutter average. When the target enters the CFAR block, the target signal will raise the clutter average and degrade the ability to detect the nearby target incidently located in the detection cell. The detection degradation due to the target interference has been found to be unacceptable especially if radar operates in very heavy target environments. For example, a target with signal to noise ratio of 20 dB will yield 1.5 dB detection degradation if target occupies only 2 percent of a CFAR block. The degradation is found to be even more severe if target range extent or amplitude is large. Multiple targets such as a fleet of naval vessels or aircraft are not unusual in the real sea environment. Previous attempts to alleviate the target interference include the technique of increasing the CFAR block size. However, the technique can only alleviate but not totally eliminate the interference effect. Furthermore, there are some cases for example, such as high PRF radar, where the CFAR block cannot be extended. To eliminate the above-mentioned problems for a CFAR detector, a unique doubly adaptive detector apparatus is presented.

SUMMARY OF THE INVENTION

The present invention utilizes a double threshold mean level constant false alarm rate detection. The false alarm rate at the low threshold is used as a measure of the degree of non-Rayleighness of the clutter and is used to vary the high threshold or detection threshold to control the false alarm rate. The doubly adaptive constant false alarm rate detector apparatus is based upon the use of a second and additional parallel adaptive detector which operates on a lower threshold. The threshold crossing rate of this auxiliary detector, which depends upon the clutter statistics, is used to adjust the base multiplier settings of the main detector.

It is one object of the present invention, therefore, to provide a new and improved doubly adaptive constant false alarm rate detector apparatus.

It is another object of the invention to provide an improved doubly adaptive constant false alarm rate detector apparatus wherein the false alarm rate at low threshold is used as a degree of non-Rayleighness of the clutter.

It is yet another object of the invention to provide an improved doubly adaptive constant false alarm rate detector apparatus wherein the lower threshold setting of an auxiliary detector is utilized to set the multiplier base for the main detector.

These and other advantages, objects and features of the invention will become more apparent after considering the following description taken in conjunction with the illustrative embodiment in the accompanying drawings.

BRIEF DESCRIPTION OF THE DRAWINGS

The sole FIGURE is a block diagram of the doubly adaptive constant false alarm rate detector apparatus according to the present invention.

DESCRIPTION OF THE PREFERRED EMBODIMENT

Referring now to the FIGURE, there is shown a doubly adaptive constant false alarm rate detector apparatus utilizing a shift register 10 which has a plurality of cells or position to receive data therein. One cell 12 is selected to provide an output signal to comparator 16. The remaining outputs from the shift register 10 are applied to the summing unit 14. The output from the summing unit 14 is applied to a divider unit 18 where it is divided by the total number of samples. The output from the divider unit 18 is multiplied by a constant in multiplier unit 20 and applied to comparator 22. The output from sample cell 24 is also applied to comparator 22. The output from comparator 22 is applied to shift register 26 and then to unit 28 for summing. The output of the summing unit 28 is applied to a table 30 of clutter statistics which applies a threshold level, Km to multiplier 32. This auxiliary parallel (doubly) adaptive detector loop which has a lower threshold setting than the main adaptive detector loop, is utilized to adjust the base multiplier setting of the main detector. The output from multiplier 32 is multiplied in multiplier 34 to provide a threshold level $T_H$ which is applied to comparator 16. The output from cell 12 and threshold level $T_H$ are compared in comparator 16 to determine a target presence.

The further detailed description will explain the operation of the doubly adaptive constant false alarm rate detector apparatus with greater clarity. In a radar receiver (not shown) the output of a linear envelope detector is A/D converted. The output of the A/D converter is loaded into a shift register 10 and clocked along the register. The outputs from C cells on both sides of the cell which is to be examined for detections, are summed and the resultant sum divided by the total number of samples summed to provide a measurement of the mean. This mean is multiplied by a constant $k_L$ to provide a threshold $T_L$ to an amplitude comparator to determine whether the amplitude of the cell to be examined exceeds $T_L$. If the threshold $T_L$ is exceeded a 1 (one) is loaded into low detector register 26 of length n cells. If the threshold level $T_L$ is not exceeded, a zero is loaded. The sum of the number 1's in the register is a measure of the false alarm rate at the low threshold. This sum is used to address a lookup table 30 to provide a modifying multiplier $k_M$ to change the apparent mean for the target detection channel. The mean is multiplied by $k_M$ and then $K_H$ to provide a threshold $T_H$ for target detection. The factor $k_H$ is picked to give the desired false alarm rate for Rayleigh noise. The target cell 12 amplitude is compared with $T_H$ to determine whether a detection has occurred. The lookup table can be loaded in any fashion desired based on the class of statistics that are expected.

As the number of detections in the low detector register increases, the value of $k_M$ is increased and vice versa to control the high threshold. The number of cells, n, must be substantial; i.e., 256; in order to provide a good measure of the statistics at the low threshold. On the other hand, n cannot be too large or there will be too much delay in modifying the threshold as the statistics vary. The multiplier, $k_L$, must be picked to give a substantial variation in false alarm rate as the statistics vary. For Weibull clutter, a value of two appears to be a good choice and results in the virtual elimination of one multiplier in the mechanization as the multiplication becomes a simple one-bit shift in the mean. The two multipliers $k_M$ and $k_H$ can be combined in the lookup table resulting in elimination of another multiplier.

The present apparatus provides an additional side benefit. It is difficult to achieve a zero D.C. bias in the envelope detector and A/D converter. Any D.C. bias will result in either an increase or decrease in the false alarm rate in a conventional CFAR apparatus, wherein the present apparatus will sense the change and compensate to minimize the effects of any residual D.C. bias.

Although the invention has been described with reference to a particular embodiment, it will be understood to those skilled in the art that the invention is capable of a variety of alternative embodiments within the spirit and scope of the appended claims.

What is claimed is:

1. A doubly adaptive constant false alarm rate detector apparatus comprising in combination:
    a shift register having a plurality of stages, said shift register receiving a digital input signal, each stage of said plurality of stages having an output, a stage one being selected to provide a first target output, said stage one being located substantially in the center of said plurality of stages, a stage two which is located subsequent to said stage one, being selected to provide a second target output,
    a summing unit connected to said shift register to receive the output from each stage in said plurality of stages excluding stages one and two, said summing unit summing the outputs from said shift register to provide a total sum, said summing unit including a dividing means, said dividing means dividing said total sum by the number of stages in said shift register to provide a mean output,
    a first detection means receiving said mean output, said first detection means receiving said second target output, said first detection means providing a first threshold signal in response to said mean output, said first detection means comparing said first threshold signal and said target output to provide a target level signal, said first detection means providing a control signal in response to said target level signal, and
    a second detection means receiving said mean output, said second detection means receiving said control signal, said second detection means receiving a constant factor, said second detection means multiplying said means output first by said control signal and then by said constant factor to provide a second threshold signal, said second detection means receiving said first target output, said second detection means comparing said first target output and said second threshold signal to provide a target detection signal in response to the signal comparison.

2. The apparatus as described in claim 1 wherein said second detection means comprises in combination:
    a first multiplier unit receiving said mean output and said control signal, said first multiplier unit multiplying said mean output by said control signal to provide a mean signal,
    a second multiplier unit receiving said mean signal and said constant factor, said second multiplier multiplying said mean signal by said constant factor to provide said second threshold signal, and,
    a comparator means receiving said second threshold signal and said first target output, said comparator means providing said target detection signal in response to the comparison of said first target output with said second threshold signal.

3. The apparatus as described in claim 2 wherein said comparator means comprises a two input AND gate.

* * * * *